3,157,584
METHOD FOR THE PREPARATION OF FRANGULIN
Charles Pouchet, % Droit et Pharmacie, 5 bis
Rue de Berri, Paris 8, France
No Drawing. Filed Apr. 13, 1961, Ser. No. 102,654
Claims priority, application France, Apr. 15, 1960,
825,286, Patent 1,263,282; Jan. 10, 1961, 849,466
8 Claims. (Cl. 195—65)

This invention relates to the extraction and isolation for industrial use of anthraquinone derivatives occurring in nature.

It has long been known that a rather wide variety of quinone derivatives, primarily polyhydroxyanthraquinones, occur free or combined in a number of plants, particularly in those of the Rhamnaceae family. In all cases where a satisfactory synthesis process yielding a product of high purity has not been developed as yet, industry utilizes raw materials of plant origin, provided that a process is available for selective extraction giving a satisfactory yield.

Referring specifically to 1,3,8-trihydroxy-6-methylanthraquinone-1-rhamnoside, also known as frangulin, this compound has never been isolated in the pure state other than by laboratory methods directed to establishing its chemical structure and determining its properties, such as its melting point, with maximum accuracy. A moderate yield was sufficient for the purpose. Moreover, the methods employed (for instance, by M. Bridel and C. Charaux, Comptes Rendus Acad. Sci., Paris, 1930, pp. 1151–1374) could not be adopted for plant-scale manufacture because they involved the use of highly volatile and flammable solvents such as diethyl ether. Then, too, as was pointed out by R. H. Thompson in his work, "Naturally Occurring Quinones" (Butterworth, London, 1959), frangulin, which occurs in the bark of certain genera of Rhamnaceae, is present practically only in combination and the findings of the most recent researches are somewhat inconsistent. Some workers even assert that within the space of a year frangulin is converted nearly in its entirety by enzymatic reduction to 1,3,8 - trihydroxy - 6 - methylanthraquinone, or emodin. This theory has been disproved by the results of the investigations conducted by the applicant. It seems to have stemmed from the inadequacy of the processes proposed up to now, which either failed to provide for effective control of the molecular reduction reactions, carrying them to the frangulin stage and stopping them there, or did not permit practical and sufficiently selective separation of the frangulin from other anthraquinonoid or anthraquinonic compounds liberated in the course of these complex reactions. It is known that the chemical structure of frangulin is between that of glucofrangulin, a glucorhamnoside that is synthesized within the plant itself, and that of the corresponding aglucone, or emodin.

The primary object of this invention is to provide a process for the preparation of 1,3,8-trihydroxy-6-methylanthraquinone-1-rhamnoside by selective extraction of portions of plants of the Rhamnaceae family or, more specifically, the bark of alder buckthorn (*Rhamnus frangula*), by the adoption of relatively simple means that are certain to produce, with excellent yield, a definite compound that is practically free of trace impurities, for example, other anthraquinone derivatives of closely related or allied structure.

The novel process in accordance with the invention for the preparation of 1,3,8-trihydroxy-6-methylanthraquinone-1-rhamnoside by selective extraction of Rhamnaceae (more specifically, of the bark of alder buckthorn which was cropped, air-dried, and ground into a powder one to two years previous to its use as a starting material in the process), is characterized particularly by the fact that after the raw material has been subjected to enzymatic autohydrolysis by maceration in cold water, maceration is continued for one hour after incorporation of an insoluble and nontoxic carbonate such as calcium carbonate or magnesium carbonate, added as a powder in a proportion of about 10 percent of the weight of the weight of the raw material, whereupon the material is filtered and the residue is purified by copious washes with cold water followed by several rinses with boiling water. It is then dried and subjected to the concurrent but separate action of two selective solvents, the first, a mixture of from one to three volumes of ethyl acetate to one volume of ethyl alcohol, being used hot to extract the crude frangulin from its plant matrix, the second, methyl alcohol, being used cold to assure its removing nothing except the bulk of the impurities still present in the crude frangulin when it is recovered from the filter after the extract has been concentrated and cooled and a small amount of water has been added to it. The frangulin is then recrystallized in a mixture having a normal amyl alcohol base, and preferably in a mixture of 35 volumes of n-amyl alcohol, 50 volumes of ethyl alcohol and 15 volumes of ethyl acetate.

The aqueous maceration which promotes or at least enhances the enzymatic autolysis is carried out by adding cold water to the raw material at the rate of about four volumes per weight of raw material. The ratio is not particularly critical; more or less water may be used without departing from the scope of the invention. The incorporation of the insoluble carbonate toward the end of the macerating operation serves to neutralize any acidity which would give rise to more or less appreciable hydrolysis of the frangulin molecule before the more complex glucosides are completely split down selectively to simple rhamnoside of emodin or frangulin. Because of the very poor solubility in water of the carbonates selected (calcium carbonate or magnesium carbonate), this acid-neutralizing influence is exerted steadily up to the end of the hot-extraction treatment.

Among the insoluble carbonates adapted to the practice of the invention is calcium carbonate—for example, precipitated calcium carbonate, which because of its fineness lends itself particularly well to the application here involved. The products which in the United States are sold under the trade names "Aeromatt" and "Albacar" are ideally suited for the purpose. Magnesium carbonate, too, may be used.

After copious washing with cold water, the carbonaceous mixture is taken up with nearly boiling water, suction filtered and ovendried at 70° C. to 80° C., whereupon it is repeatedly extracted at a temperature near the boiling point with a mixture of from one to three volumes of ethyl acetate to one volume of ethyl alcohol.

It has been found in accordance with the invention that although ethyl acetate will dissolve out the frangulin selectively, its dissolving power is limited, which makes it necessary to use a fairly large quantity; and that ethyl alcohol will dissolve out not only the frangulin but unfortunately also other impurities which accompany it, so that the addition of ethyl alcohol to ethyl acetate in the proportions indicated increases the dissolving power of the ester considerably without appreciably impairing its selectivity. In accordance with a preferred procedure for practicing the invention, a mixture of equal volumes of these two solvents is used to extract the carbonated mixture of powdered bark.

When the hot extraction has been completed, the combined extracts are concentrated to about one-seventh of their volume. The material is then allowed to cool, a very small amount of water is added, and the material is allowed to crystallize under refrigeration until the next day, when it is filtered to separate out the precipitate, which is immediately washed with about twenty times as much cold methanol. The precipitate is suction filtered and promptly recrystallized in a mixture having a normal amyl alcohol base. In accordance with a secondary characteristic of the invention, a mixture of 35 volumes of n-amyl alcohol to 50 volumes of ethyl alcohol and 15 volumes of ethyl acetate is employed for this recrystallization. While normal amyl alcohol alone might be utilized for this purpose, its use would entail certain practical drawbacks. Employing a mixture having the proportions indicated makes it possible to proceed at a lower temperature.

In performing this recrystallization, the cooled liquid is preferably filtered only after an additional dwell in the refrigerator. The material is then oven-dried to constant weight at 70° C. In this way, a frangulin of high purity whose melting point is between 246° C. and 248° C. is obtained. An analysis of the product (monohydrate) has yielded the following figures.

Rhamnose: Calculated—37.79%. Found—38.04%.
Emodin: Calculated—62.21%. Found—60.79%.

Depending on the species of Rhamnus used, the over-all yield will be in the order of 3 percent on the basis of dry weight of raw material. This is appreciably more than the 0.6 to 0.8 percent of frangulin which according to a recent estimate is contained in the bark of alder buckthorn. Comparison of these figures indirectly confirms the efficiency of the operating procedure in accordance with the invention.

In some instances the final recrystallization in the mixture having a normal amyl alcohol base may be eliminated and the cold methyl alcohol may be employed as a selective solvent for the impurities only after the precipitate resulting from hot extraction by means of the acetate and alcohol mixture has been subjected to the action of an identical mixture, applied successively cold, hot and cold and in an amount which is far too small to result in complete dissolution at boiling.

It has been found in accordance with the invention that a frangulin of high purity can be obtained by first washing the precipitate of the crude frangulin, prepared after hot extraction, twice with about twelve times its weight of a cold mixture identical with the one used for the hot extraction, then taking it up with a fresh quantity of the same mixture equal to about sixty times its weight, and bringing the whole to boiling with reflux after vigorous stirring, cooling, and adding a little water, filtering when precipitation is completed, and again washing twice with agitation, each time with two fresh quantities of the same cold mixture, each equal to about twelve times its weight. The frangulin so purified contains but minor amounts of impurities which can be removed by two successive washes with cold methyl alcohol, using each time about twelve volumes of alcohol per weight of precipitate, stirred each time for five to six minutes and then allowed to stand for half an hour before filtering.

A few nonlimitative examples of how the invention may be practiced are given below.

*Example 1*

2 liters of water is added to 500 grams of medium-fine (60 mesh screen) powder of alder buckthorn, and the mixture is allowed to stand for 15 hours at ambient temperature. 50 g. of powdered calcium carbonate is then added, and the mixture is carefully stirred and allowed to stand for 1 hour. Then it is filtered, and the powder is washed three times with cold water, each time with 1 liter. 1 liter of water is then added to the still moist powder, whereupon the mixture is heated just to boiling, immediately filtered and rinsed once with boiling water. The powder is taken up with 1 liter of cold water and again heated until boiling sets in. It is then immediately filtered and rinsed again with boiling water. This operation is repeated and the powder is then oven-dried at 70° C. to 80° C. The yield, about 450 g. of powder, is distributed into the shells of a battery of Soxhlet extractors. A total of about 3 liters of a mixture of equal volumes of ethyl acetate and ethyl alcohol is introduced into the apparatus, and heated to reflux, and the extraction is allowed to proceed for 40 hours. After cooling, the partly precipitated products of extraction are combined, and concentrated to a volume of about 500 cc. The concentrate is allowed to cool, whereupon from 1 to 2 cc. of water is added and crystallization is allowed to proceed under refrigeration for several hours. The material is then filtered to separate the precipitate, which is washed by agitating with about 150 cc. of cold methanol, filtered, washed again with 150 cc. of cold methanol, suction filtered and then recrystallized in 150 parts of a boiling mixture of 35 volumes of n-amyl alcohol, 50 volumes of ethyl alcohol, and 15 volumes of ethyl acetate. The precipitate is allowed to cool, and after standing a few hours in the refrigerator, it is oven-dried to constant weight at 70° C. The yield is 12.61 g. of a product melting at 248° C., which corresponds to an over-all yield of 2.52 percent.

*Example 2*

20 kg. of bark of alder buckthorn and 75 liters of cold water are charged into a vat holding about 120 liters and allowed to stand for 18 hours at ambient temperature with occasional stirring by means of a mechanical agitator; 2 kg. of powdered calcium carbonate are then added, mixed thoroughly, and the whole is allowed to stand for 1 hour. It is then agitated anew and filtered, and the powder is washed three times by stirring with a volume of about 50 liters of cold water each time. After filtering 40 liters of water is then added to the moist powder and heated in the vat exactly to boiling. The mixture is then immediately filtered and the filtrate rinsed once with 20 liters of boiling water. The powder is then again stirred into 40 liters of cold water and the mixture again heated nearly to boiling, whereupon it is filtered and the filtrate rinsed anew with 20 liters of boiling water. The powder is oven-dried at 70° C. This yields about 19 kg., which is treated with 130 liters of a mixture of equal volumes of ethyl acetate and ethyl alcohol. This is heated to reflux for ½ hour at 70° C. to 75° C. and immediately filtered. A filtrate $F_1$ and a residue $R_1$ are so obtained. The residue $R_1$ is taken up with 95 liters of a mixture of equal volumes of ethyl acetate and ethyl alcohol, heated for 1 hour to from 70° C. to 75° C., and filtered while almost boiling. A new filtrate $F_2$ and residue $R_2$ are so obtained. This sequence of operations is repeated a third, fourth and fifth time. The resultant five filtrates $F_1$, $F_2$, $F_3$, $F_4$ and $F_5$ are brought together and concentrated to one-seventh of the total volume. 50 cc. of water is added and the mixture is allowed to stand in the refrigerator until the next day. Then the precipitate is separated by filtration and suspended in about 5 liters of cold methanol. The suspension is agitated and then filtered. The color of the precipitate, at first maroon, becomes lighter after the first wash with methanol and turns orange. This operation is repeated once. After these washes with cold methanol, the precipitate is suction-filtered, and the frangulin is recrystallized in a mixture of 35 volumes of n-amyl alcohol, 50 volumes of ethyl alcohol and 15 volumes of ethyl acetate. The mixture is allowed to stand for a few hours in the refrigerator and is then filtered. After oven-drying at 75° C., a product of orange color melting at 248° C. to 249° C. (Maquenne block) is obtained. The yield is 2.88 percent.

*Example 3*

10 kg. of powdered bark of alder buckthorn is stirred with 45 liters of cold water. After standing overnight at a temperature of about 15° C., 1 kg. of powdered magnesium carbonate is added with vigorous stirring so as to produce a homogeneous mixture. It is allowed to stand for 1 hour, stirred briefly, filtered, and washed three times by agitation with 25 liters of cold water each time. 20 liters of water is then added to the still moist powder, brought to boiling, and filtered when the boiling point has been reached. This operation is repeated, followed by oven-drying at 70° C. This yields 9.6 kg. of dry product. To this, 45 liters of ethyl acetate and 15 liters of ethyl alcohol are added. The whole is carefully stirred and then heated to 70° C. to 75° C., this temperature being maintained for 30 minutes. The mixture is then filtered hot, which yields a filtrate $F'_1$ and a residue $R'_1$. The latter is recovered with 50 liters of the same mixture of ethyl acetate and alcohol. The whole is heated over ¾ hour to 70° C. to 75° C. and filtered at that temperature. This last extraction is repeated twice. The four filtrates are then brought together, concentrated to about 30 liters, whereupon 30 cc. of water is added and the whole is kept in the refrigerator until the next day. After the precipitate has been filtered, it is agitated with 4 liters of cold methanol and filtered once more. The filtrate is suction-filtered and promptly recrystallized in the mixture of n-amyl alcohol, ethyl alcohol and ethyl acetate specified in the preceding examples. The mixture is allowed to stand in the cold for a few hours and then is filtered, and the filtrate is oven-dried at 70° C. The product is an orange powder melting at from 246.5° C. to 248.5° C. (Maquenne block), the over-all yield being 2.74 percent.

*Example 4*

210 liters of water is added to 50 kg. of powdered bark of alder buckthorn and the mixture is allowed to stand for 18 hours at ambient temperature. 5 kg. of precipitated calcium carbonate is then incorporated in this mixture as homogeneously as possible. After 1 hour, the mixture is filtered and the filtrate is washed three times with cold water, about 100 liters of water being used each time. It is then sucked off, whereupon 100 liters of water is added to it and the mixture is heated nearly to boiling and promptly filtered. This operation is repeated once, followed by filtering, sucking off and oven-drying at 70° C. The product is crushed, and 350 liters of a mixture of two volumes of ethyl acetate and one volume of ethyl alcohol is added to it. The mixture is heated to 70° C. to 75° C. over 30 minutes and filtered hot. The filtrate is put aside, and the residue is taken up with 280 liters of the 2:1 mixture of acetate and alcohol. The whole is heated to 70° C. over ¾ hour and then filtered while boiling. This operation is repeated three times, each time with the same quantity (280 liters) of solvent mixture. The five filtrates are brought together and concentrated to about 200 liters by distillation, the recovered clean solvent being reusable in a subsequent operation. After cooling, 125 cc. of cold water is added, and the whole is allowed to stand for 10 to 12 hours in the refrigerator. The precipitate is then filtered, washed by agitating with 12 liters of cold methanol, filtered, washed with 12 liters of fresh, cold methanol, suction-filtered and promptly recrystallized in the mixture used in the three preceding examples. After a few hours, the mixture is filtered, and the filtrate is oven-dried at 70° C. An orange-colored product melting at from 246° C. to 248° C. (Maquenne block) is obtained with a yield of 2.91 percent.

*Example 5*

About 40 kg. of powdered bark of alder buckthorn is slowly stirred with 200 liters of cold water at ambient temperature for eighteen hours. 4 kg. of powdered calcium carbonate is then introduced and mixed well, and the whole is allowed to stand for an hour. Then it is stirred anew and filtered, and the moist powder is washed by agitating with 100 liters of cold water, repeated three times. After decanting and drying, 80 liters of water is added to the moist powder, and the mixture is heated until it begins to boil. It is then filtered while boiling and rinsed with 40 liters of boiling water. 80 liters of cold water is then added to the powder and heated until boiling sets in, whereupon it is filtered, and the precipitate is again rinsed with 40 liters of boiling water. After oven-drying at 70° C. and crushing, about 38 kg. of powder is obtained, which is extracted, by the same procedure as that described under example 2 above, successively with 250 liters and three times 200 liters of a mixture of equal volumes of ethyl acetate and ethyl alcohol.

The liquid extracts are combined and concentrated to about one-eighth of the total volume. 100 cc. of water is then added, and the whole is allowed to stand in the refrigerator until the next day. Then it is filtered to separate the precipitate of crude frangulin, and while it is still moist, it is twice vigorously agitated for a few minutes, each time with 12 liters of the mixture of equal volumes of ethyl acetate and ethyl alcohol. After filtering, the moist precipitate is recovered with 60 liters of the same mixture. The whole is boiled for 5 minutes in a reflux apparatus with vigorous agitation before and after the operation, whereupon about 50 cc. of water is added and the whole is allowed to cool until the next day, when it is filtered and again washed, with agitation, repeated twice, each time with 12 liters of the same mixture.

The purification is completed by two washes and agitation with 12 liters of cold methyl alcohol each time; and after allowing the mixture to stand a few minutes, it is filtered.

The frangulin is dried in the open for half a day, then oven-dried at 60° C. for two hours.

In this way, a product having an attractive yellow-orange color and melting near 249° C. (Maquenne block) is obtained, the yield being 2.91 percent.

The invention is not, of course, limited to the various procedures described above, which have been outlined solely by way of example.

What is claimed is:

1. A process for the preparation of 1,3,8-trihydroxy-6-methylanthraquinone-1-rhamnoside by selective extraction of Rhamnaceae which comprises subjecting said Rhamnaceae to enzymatic autohydrolysis in the presence of water and an acidity-neutralizing, insoluble non-toxic carbonate added in a proportion of about 10% by weight of the Rhamnaceae, filtering the resulting mixtures to recover a solid residue, washing said residue with cold water and rinsing said cold water-washed residue with boiling water, drying the resultant washed residual material, extracting said residual material with a hot solvent composed of a mixture of ethyl acetate and ethyl alcohol having a volume ratio in the range of from about 1:1 to about 3:1, respectively, to provide an extract containing refined frangulin, and recovering essentially pure frangulin from said extract.

2. The method according to claim 1 wherein said non-toxic carbonate is selected from the group consisting of calcium carbonate and magnesium carbonate.

3. The process according to claim 1 wherein said extraction with said ethyl acetate-ethyl alcohol solvent mixture is carried out by contacting said residual material with fresh solvent mixture in a series of steps and the extracts obtained in the steps are combined to provide the extract mixture for frangulin recovery.

4. The method according to claim 1 wherein said ethyl acetate-ethyl alcohol extract is concentrated, the resulting concentrate is cooled to effect the crystallization of refined frangulin, and the refined frangulin is recrystallized to provide essentially pure frangulin.

5. The method according to claim 4 wherein said refined frangulin obtained from said concentrate is washed with cold methanol preliminary to the recrystallization step.

6. The method according to claim 4 wherein water is added to said concentrate to promote crystallization of said refined frangulin therefrom.

7. The method according to claim 4 wherein said recrystallization is carried out in a mixture of n-amyl alcohol, ethyl alcohol and ethyl acetate.

8. The process according to claim 7 wherein said recrystallization is conducted in a solvent mixture having a volume ratio of n-amyl alcohol to ethyl alcohol to ethyl acetate of about 35:50:15.

References Cited in the file of this patent

UNITED STATES PATENTS

| | | |
|---|---|---|
| 2,312,588 | Rabald et al. | Mar. 2, 1943 |
| 2,557,916 | Rosen et al. | June 19, 1951 |

FOREIGN PATENTS

| | | |
|---|---|---|
| 484,578 | Canada | July 1, 1952 |

OTHER REFERENCES

Chemical Abst., vol. 20, 3332$^5$, (1926).
Chemical Abst., vol. 25, 984$^4$, (1931).
The Merck Index, 7th ed., p. 462 (1960).